(12) United States Patent
Prabhu

(10) Patent No.: US 11,433,352 B1
(45) Date of Patent: Sep. 6, 2022

(54) APPARATUS AND METHOD FOR OXIDIZING FLUID MIXTURES USING POROUS AND NON-POROUS HEAT EXCHANGERS

(71) Applicant: Edan Prabhu, Mission Viejo, CA (US)

(72) Inventor: Edan Prabhu, Mission Viejo, CA (US)

( * ) Notice: Subject to any disclaimer, the term of this patent is extended or adjusted under 35 U.S.C. 154(b) by 0 days.

(21) Appl. No.: 17/451,296

(22) Filed: Oct. 18, 2021

(51) Int. Cl.
  *B01J 19/24* (2006.01)
  *B01D 53/72* (2006.01)
  *B01D 53/62* (2006.01)
  *B01D 53/58* (2006.01)
  *F28F 13/00* (2006.01)

(52) U.S. Cl.
  CPC ............ *B01D 53/72* (2013.01); *B01D 53/58* (2013.01); *B01D 53/62* (2013.01); *B01J 19/248* (2013.01); *B01J 19/2475* (2013.01); *F28F 13/003* (2013.01); *B01D 2251/102* (2013.01); *B01D 2257/108* (2013.01); *B01D 2257/406* (2013.01); *B01D 2257/502* (2013.01); *B01D 2257/708* (2013.01); *B01D 2257/7025* (2013.01); *B01J 2219/2401* (2013.01)

(58) Field of Classification Search
  CPC .................. B01J 19/248; B01J 19/2475; B01J 2219/00135; B01J 2219/2401; B01J 2219/2414; B01J 2219/2424; B01J 2219/2434; B01J 2219/2438; B01J 2219/2467; B01J 2219/2466; B01J 2219/2485; B01J 2219/2487
  See application file for complete search history.

(56) References Cited

U.S. PATENT DOCUMENTS

| | | |
|---|---|---|
| 3,810,732 A | 5/1974 | Koch |
| 3,928,961 A | 12/1975 | Pfefferle |
| 3,975,900 A | 8/1976 | Pfefferle |
| 4,052,143 A | 10/1977 | Sandviknes |
| 4,202,168 A | 5/1980 | Acheson et al. |
| 4,209,303 A | 6/1980 | Ricks |
| 4,403,941 A | 9/1983 | Okiura et al. |
| 4,442,901 A | 4/1984 | Zison |
| 4,467,610 A | 8/1984 | Pearson et al. |
| 4,534,165 A | 8/1985 | Davis, Jr. et al. |
| 4,643,890 A | 2/1987 | Schramm |
| 4,769,149 A | 9/1988 | Nobilet et al. |
| 4,870,824 A | 10/1989 | Young et al. |
| 5,108,717 A | 4/1992 | Deller et al. |
| 5,165,884 A | 11/1992 | Martin et al. |
| 5,263,314 A | 11/1993 | Anderson |
| 5,326,253 A | 7/1994 | Dalla Betta et al. |
| 5,326,537 A | 7/1994 | Cleary |
| 5,329,955 A | 7/1994 | Gensler et al. |
| 5,533,890 A | 7/1996 | Holst et al. |
| 5,592,811 A | 1/1997 | Dodge et al. |
| 5,635,139 A | 6/1997 | Holst et al. |
| 5,649,720 A | 7/1997 | Rink et al. |

(Continued)

FOREIGN PATENT DOCUMENTS

| | | |
|---|---|---|
| CA | 2251627 | 10/1997 |
| JP | 2004105306 | 4/2004 |

*Primary Examiner* — Lessanework Seifu
(74) *Attorney, Agent, or Firm* — Cionca IP Law P.C.; Marin Cionca

(57) ABSTRACT

A reactor for oxidizing low concentrations of methane in air or other oxidizable fluid mixtures using a porous heat exchanger and a non-porous heat exchanger and an activation zone that allows the oxidation of very weak streams of methane in air or of other oxidizable fluid mixtures.

16 Claims, 8 Drawing Sheets

(56) References Cited

U.S. PATENT DOCUMENTS

| | | |
|---|---|---|
| 5,685,156 A | 11/1997 | Willis et al. |
| 5,832,713 A | 11/1998 | Maese et al. |
| 5,862,858 A | 1/1999 | Wellington et al. |
| 5,921,763 A | 7/1999 | Martin |
| 6,019,172 A | 2/2000 | Wellington et al. |
| 6,033,207 A | 3/2000 | Cummings |
| 6,107,693 A | 8/2000 | Mongia et al. |
| 6,158,222 A | 12/2000 | Retallick |
| 6,205,768 B1 | 3/2001 | Dibble et al. |
| 6,226,976 B1 | 5/2001 | Scott et al. |
| 6,334,769 B1 | 1/2002 | Retallick et al. |
| 6,339,925 B1 | 1/2002 | Hung et al. |
| 6,393,821 B1 | 5/2002 | Prabhu |
| 6,595,001 B2 | 7/2003 | Rautenbach et al. |
| 6,675,583 B2 | 1/2004 | Willis et al. |
| 6,895,760 B2 | 5/2005 | Kesseli |
| 7,096,671 B2 | 8/2006 | Bland et al. |
| 8,393,160 B2 | 3/2013 | Prabhu |
| 8,621,869 B2 | 1/2014 | Prabhu |
| 8,893,468 B2 | 11/2014 | Prabhu |
| 9,057,028 B2 | 6/2015 | Prabhu |
| 9,194,584 B2 | 11/2015 | Watts |
| 9,587,562 B2 | 3/2017 | Ostebee et al. |
| 9,926,846 B2 | 3/2018 | Prabhu |
| 10,697,630 B1 | 6/2020 | Prabhu |
| 2004/0011523 A1 | 1/2004 | Sarada |
| 2004/0021235 A1 | 2/2004 | Corr, III et al. |
| 2004/0119291 A1 | 6/2004 | Hamrin et al. |
| 2006/0150635 A1 | 7/2006 | Su et al. |
| 2007/0054226 A1 | 3/2007 | Carrioni et al. |
| 2009/0100820 A1 | 4/2009 | Prabhu |

APPARATUS AND METHOD FOR OXIDIZING FLUID MIXTURES USING POROUS AND NON-POROUS HEAT EXCHANGERS

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF INVENTION

1. Field of the Invention

The invention relates generally to reactors and more specifically to a reactor which utilizes porous and non-porous heat exchangers to start and sustain the oxidation of weak methane-air mixtures or other oxidizable fluid mixtures.

1. Description of the Related Art

Methane seeps into the atmosphere from both anthropogenic and natural sources, such as, for example, coal mines, oil and gas production, landfills, cattle farms, agriculture, wetlands, and bogs. Annually, methane gas emissions contributed about 16% of all greenhouse gas emissions, which is over 500 million tons emitted into the atmosphere annually. Because methane emissions are 15 to 20 times more potent than carbon dioxide, the greenhouse effect of methane emissions is equal to over 10 gigatons that of carbon dioxide emissions. In order to reduce climate change, it is vital to oxidize the methane being emitted daily into the atmosphere.

The most common method of oxidizing methane is combustion, which only works if the concentration of methane is sufficient. Most combustion processes require a concentration of at least 20% methane by volume. Between 5% and 15% by volume in air, methane is explosive. It is difficult to oxidize and remove methane from air in very low concentrations. Thus, there is a need for a method of oxidizing concentrations of methane less than 5% by volume.

The most commonly used system for the oxidation of weak streams of methane, such as less than 5% by volume, and other hydrocarbons commonly known as volatile organic compounds (VOCs) that need to be oxidized to reduce harmful emissions, is the Regenerative Thermal Oxidizer (RTO). In an RTO, a vessel is filled with ceramic, then the ceramic is heated above the temperature required for fast oxidation, for example >800° C. Heating ceramics takes a long time and a lot of fuel. Next, the weak methane stream is passed through the heated ceramic, oxidizing the methane. During the oxidation process, the inlet section of the ceramic becomes cooler as it gives up its heat to the incoming gas, and the outlet of the ceramic becomes hotter because the oxidation is exothermic. Therefore, the flow of the stream through the ceramic must be reversed every few minutes to stop the cooling trend from snuffing out the oxidation reaction. These reversals make RTOs a discontinuous oxidation method. Additionally, for RTOs, the large amount of energy stored in the heat soak media acts as a thermal mass. RTOs have other challenges, such as show responsiveness to changes in concentration and spalling of the ceramic into dust that can be spewed into the atmosphere.

Therefore, there is a need to solve the problems described above by providing a device and method for oxidizing methane and other hydrocarbons that does not require ceramics, uses less fuel, is continuous, does not require periodic flow reversal, and does not emit dust into the atmosphere.

The aspects or the problems and the associated solutions presented in this section could be or could have been pursued; they are not necessarily approaches that have been previously conceived or pursued. Therefore, unless otherwise indicated, it should not be assumed that any of the approaches presented in this section qualify as prior art merely by virtue of their presence in this section of the application.

BRIEF INVENTION SUMMARY

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

The rate of oxidation of methane increases exponentially with temperature. At 20° C., methane in air will oxidize in decades. At 600° C. it will oxidize in several seconds. At 750° C., oxidation occurs in less than 1 second. At 800° C., in less than 0.2 seconds. At 900° C., in less than 0.01 second. Heating of the methane-air mixture can be sped up by increasing the surface area of the methane-air mixture exposed to high temperature by, for example, breaking the mixture into smaller particle sizes. Additionally, oxidation is an exothermic reaction, so the methane will heat up its surroundings when oxidized. For example, if a concentration of 0.2% by volume of methane in air is oxidized, then the temperature of the mixture increases by about 50° C. As it will be described in more detail hereinafter, the disclosed invention utilizes these three characteristics, i.e., rate of oxidation with temperature, particle size, and temperature increase from the exothermic reaction, to quickly and efficiently oxidize methane in air.

Methane is generally considered one of the most difficult gases to oxidize, and its oxidation temperature pattern is similar to that for ammonia. All other hydrocarbon gases, including VOCs and also hydrogen and carbon monoxide, oxidize at lower temperatures. A process that can oxidize methane will also oxidize any other hydrocarbon gas, and also hydrogen, carbon monoxide, and ammonia. It will also oxidize combinations or mixtures of any such gases provided sufficient oxygen is present in the mixture to achieve full oxidation. The apparatus and process described herein therefore also applies to any oxidizable gas, including hydrocarbons, VOCs, hydrogen, ammonia, carbon monoxide, or any combination of them. The oxidation temperatures and other parameters for each combination will be different, but less stringent compared to those described for methane.

Another factor affecting oxidation rates is pressure. Gas density increases with pressure, and the oxidation rates increase at higher pressures. However, the principles of oxidation and flow remain the same, and therefore the process described herein also applies to gases at any pressure. The temperatures and rates shown hereinafter apply to methane at or slightly above atmospheric pressure. It may be desirable in some instances to oxidize at higher pressures.

In an aspect, a non-porous heat exchanger is used to raise the temperature of a mixture of incoming gases close to the temperature needed for reaction. These gases then flow into the porous heat exchanger which provides the time and temperature and creates the small particles to ensure that the fluids do react fully. The pores in the porous heat exchanger break the seeping fluid into small particles, making each particle easier to be heated and therefore to react.

In another aspect, a reactor for oxidizing a concentration of methane in air is provided, the reactor combining the properties of non-porous heat transfer and porous heat transfer and comprising: an inlet disposed at the near end of the reactor with an unoxidized concentration of methane in air entering, wherein the concentration of methane in air is the less than 3% by volume; a plurality of inlet pathways extending from the near end of reactor to a far end of the reactor; a heating element disposed at the far end of the reactor, wherein the heating element is maintained at a temperature above 800° C. at which methane will oxidize rapidly, in less than 0.2 seconds; a plurality of exhaust pathways extending from the far end of the reactor to the near end of the reactor, wherein the oxidized concentration of methane in air is at or above a temperature of 750° C., which is a temperature at which methane oxidizes in less than a second; an outlet disposed at the near end of the reactor with the fully oxidized concentration of methane in air entering from the exhaust pathways and exiting the reactor; wherein, the inlet pathways and exhaust pathways are separated by membranes; a non-porous heat exchanger section disposed from the near end of the reactor to a transition, wherein the membranes which separate the inlet and exhaust pathways are membranes through which heat transfer occurs; a porous heat exchanger section disposed from the transition to the far end of the reactor; wherein the membranes which separate the inlet and exhaust pathways have a plurality of pores, wherein the pores allow the unoxidized concentration of methane in air to seep from the inlet pathways into the exhaust pathways such that the unoxidized concentration of methane in air is broken into small particles which are easier to heat and therefore easier to oxidize.

In an aspect, the membranes may be composite, such as a mixture of high temperature nickel alloys and ceramic. The use of ceramic may reduce the cost of all-metal membranes and improve the heat capacity of the membrane.

In an aspect, the pores in the walls in the porous section are selectively sized and positioned at optimal locations. The size of the pores will depend on factors such as the volume of fluid flow and how close the methane is to a rapid oxidation temperature above 800° C. and other factors. During an exemplary experiment successful oxidation was achieved for a flow rate of 25 cubic feet per minute of a concentration of about 0.8% methane in air by volume, with pores that were 0.08 inches in diameter.

In an aspect, the oxidized concentration of methane in air exiting the reactor is used for heating, power generation, to drive a turbine that powers the fan that introduces the methane-air mixture to the reactor, or other purposes.

In another aspect, a method for collecting and oxidizing weak concentrations of methane in air which would otherwise seep into the atmosphere, thereby achieving the benefit of removing emissions of a greenhouse gas, by connecting a reactor as disclosed herein to a gas collection and delivery system, wherein the gas collection and delivery system is configured to collect gas that would otherwise seep into the atmosphere and oxidizing the gas in the reactor.

The above aspects or examples and advantages, as well as other aspects or examples and advantages, will become apparent from the ensuing description and accompanying drawings.

BRIEF DESCRIPTION OF THE DRAWINGS

For exemplification purposes, and not for limitation purposes, aspects, embodiments or examples of the invention are illustrated in the figures of the accompanying drawings, in which.

DETAILED DESCRIPTION

Figure 1:
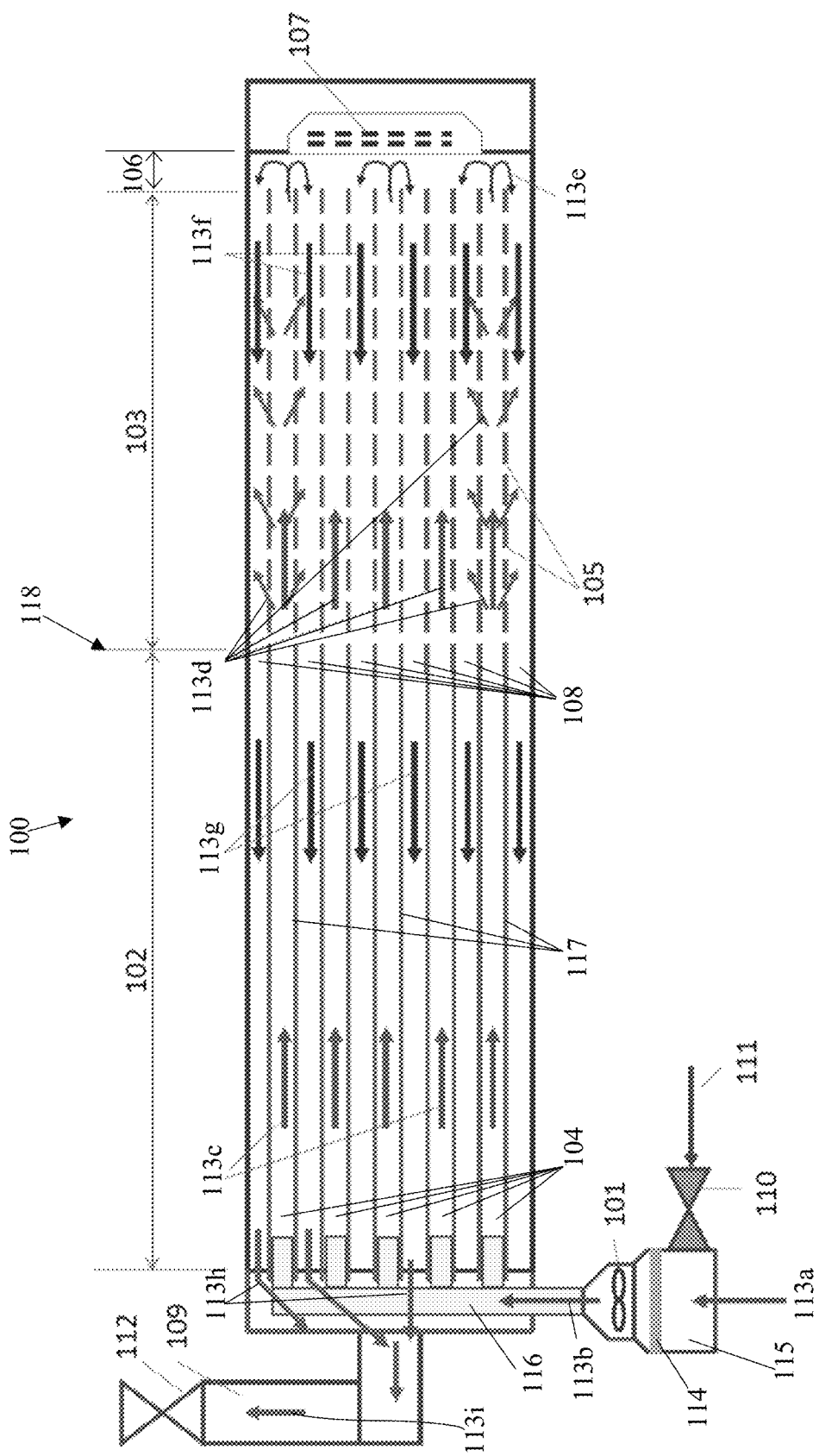
FIG. 1 illustrates a side view of and exemplary embodiment of a reactor, according to an aspect.

What follows is a description of various aspects, embodiments and/or examples in which the invention may be practiced. Reference will be made to the attached drawings, and the information included in the drawings is part of this detailed description. The aspects, embodiments and/or examples described herein are presented for exemplification purposes, and not for limitation purposes. It should be understood that structural and/or logical modifications could be made by someone of ordinary skills in the art without departing from the scope of the invention. Therefore, the scope of the invention is defined by the accompanying claims and their equivalents.

It should be understood that, for clarity of the drawings and of the specification, some or all details about some structural components or steps that are known in the art are not shown or described if they are not necessary for the invention to be understood by one of ordinary skills in the art.

For the following description, it can be assumed that most correspondingly labeled elements across the figures (e.g., 100 and 600, etc.) possess the same characteristics and are subject to the same structure and function. If there is a difference between correspondingly labeled elements that is not pointed out, and this difference results in a non-corresponding structure or function of an element for a particular embodiment, example or aspect, then the conflicting description given for that particular embodiment, example or aspect shall govern.

FIG. 1 illustrates a side view of and exemplary embodiment of a reactor 100, according to an aspect. As shown in FIG. 1, a reactor may comprise an inlet duct 115, an air inlet valve 110, a filter 114, a fan 101, an inlet passage 116, one or more inlet pathways 104, heat transfer membranes 117, a heating element 107, one or more exhaust pathways 108, an exhaust passage 109, and a shutoff valve 112. The inlet passage 116 may be disposed at the near end of the reactor 100 and the heating element 107 may be disposed at the far end of the reactor 100. As shown, the inlet pathways 104 may extend from the near end to the far end of the reactor 100 and the exhaust pathways 108 may extend from the far end to the near end of the reactor 100. The inlet and exhaust pathways 104 and 108 may be in thermal communication with each other, such that heat transfer between the pathways 104 and 108 may occur. In operation, methane-air mixture within the inlet pathways 104 may be generally unreacted and the gas in the exhaust pathways 108 has generally completed the desired reaction, i.e., oxidation of methane, and is hotter than the methane-air mixture within the inlet pathways 104. The valves 110, and 112 may be electrical, pneumatical, or other types of control valves.

Additionally, the reactor 100 may have a non-porous heat exchanger section (non-porous section) 102, a porous heat exchanger section (porous section) 103, and an activation zone 106. As shown in FIG. 1, the non-porous section 102 may be disposed from the near end of the reactor 100 to the transition 118, wherein determination of the location of the transition 118 is disclosed in greater detail hereinafter. In the non-porous section 102, the membranes 117 separating the inlet pathways 104 from the exhaust pathways 108 are non-porous. The porous section 103 may be disposed from the transition 118 to the far end of the reactor 100. In the porous section 103, the membranes 117 separating the inlet pathways 104 from the exhaust pathways 108 have a plurality of pores 105, as disclosed in greater detail hereinafter. The activation zone 106 may be disposed at the far end and may contain the heating element 107.

In the embodiment shown by FIG. 1, the reactor 100 is provided with five inlet pathways 104 and six exhaust pathways 108, wherein the inlet and exhaust pathways 104 and 108 are adjacent to each other and alternate from top to bottom through the porous section 102 and the non-porous section 103. It should be understood that the inlet and exhaust pathways 104 and 108 may have a plurality of other configurations.

Additionally, while the reactor 100, inlet pathways 104 and exhaust pathways 108 are shown as rectangular, they may also be of any shape that is suitable, such as tubular, or even more complex in order to improve heat transfer and maximize surface-to-flow ratios. While the near end and far end of the reactor 100 are described here for convenience in describing the actions taking place, they may be vertical, horizontal, or inverted or even at an angle to the vertical. While the reactor 100 and pathways 104 and 108 are shown as straight lines, they may also be curved or irregular shaped. Further, it should be understood that the terms "up", "down", "top", "bottom", "left", "right", "inner", and "outer" are used for convenience in explaining the figures and are not otherwise relevant to the invention.

Again, the rate of oxidation of methane increases exponentially with temperature. At 20° C., methane in air will oxidize in years. At 600° C. it will oxidize in several seconds. At 750° C., oxidation occurs in less than 1 second. At 800° C., in less than 0.2 second. At 900° C., in less than 0.01 second. Heating of the methane-air mixture can be sped up by increasing the surface area of the methane-air mixture exposed to high temperature by, for example, breaking the mixture into smaller particle sizes. Additionally, oxidation is an exothermic reaction, so the methane will heat up its surroundings when oxidized. For example, if a concentration of 0.2% by volume of methane in air is oxidized, then the temperature of the mixture increases by about 50° C. The disclosed invention utilizes these three characteristics, i.e., rate of oxidation with temperature, particle size, and temperature increase from the exothermic reaction, to fully oxidize methane in air.

As disclosed in greater detail hereinafter, the reactor 100 may oxidize a weak concentration of methane in air, for example less than 3% by volume, by first atomizing or breaking the methane-air mixture into small particles, utilizing heat transfer to oxidize the methane by surrounding the particles with gas at a temperature at which oxidation is very rapid, then using the heat generated by the exothermic reaction to maintain and the oxidation of the incoming methane-air mixture.

Methane seeps into the atmosphere from both anthropogenic and natural sources, such as, for example, coal mines, landfills, and wetlands. In order to reduce climate change, it is vital to oxidize the methane being emitted daily into the atmosphere. This can be accomplished by collecting the seeping methane, as disclosed in greater detail hereinafter when referring to FIGS. 5-7, and introducing the methane-air mixture 113a into the reactor 100. As an example, the methane-air mixture 113a may be at 20° C. The fan 101 may pull the methane-air mixture 113a into the reactor through an inlet duct 115. Additionally, the reactor 100 may be provided with a filter 114 to filter out unwanted particles from the methane-air mixture 113a and to keep the heat exchangers clean, wherein the filter is disposed between the fan 101 and inlet duct 115.

Additionally, in order to maintain safe operation of the reactor 100, the concentration of methane in air may need to be below a maximum, for example, no more than 2% by volume, which is well below the lower explosive limit of 5%. Furthermore, a methane concentration of 2% will increase the temperature of the gas by 500° C., which increase may be too high for the materials of the reactor (during our tests, we discovered that when oxidation began at 750° C. and the concentration of methane was 2%, the resulting temperature was approaching 1250° C., which was beyond the capacity of the heat transfer membranes and other components). The concentration of methane may be controlled by a controller 430 of FIG. 4, as disclosed in greater detail hereinafter. If the concentration of methane in air is in danger of rising above the desired maximum, then the controller 430 can introduce additional air 111 into the reactor 100 by opening an air inlet valve 110, which allows the fan 101 to pull air 111 through the filter 114 and into the reactor 100.

After passing the fan 101, the methane-air mixture 113b travels up through the inlet passage 116 and then into the inlet pathways 104. At this stage, the methane-air mixture 113c is in the non-porous heat exchanger section 102 of the inlet pathways 104, where the traveling mixture 113c is heated up by the exhaust gas 113g flowing in the opposite direction through exhaust pathways 108. Once the methane-air mixture 113c within the inlet pathways 104 reaches the transition 118, the mixture will have been heated to a temperature that is close to the temperature of about 750° C., at which temperature the methane oxidizes in about one second. It should be noted that the location of the transition 118 may be chosen to correspond to the location along the path of the inlet pathways 104 where the average temperature of the methane-air mixture is high enough that the methane will oxidize within the time available for oxidation. As an example, the desired temperature of the methane-air mixture at the transition 118 may be 750° C., at which temperature the methane will oxidize in about one second.

Next, the methane-air mixture passes the transition 118 and travels into the porous heat exchanger section 103 through the inlet pathways 104. As the methane-air mixture 113*d* continues to travel towards the activation zone 106 of the reactor 100, the mixture 113*d* is broken into small particle sizes as it seeps into the exhaust pathways 108 through the pores 105. When the seeped methane-air mixture particles enter the exhaust pathways 108, the mixture particles encounter larger volumes of hotter, oxidized gas 113*f*, thus raising the temperature of the seeped mixture particles and quickly oxidizing the methane. When the methane is oxidized, it releases heat, which raises the temperature of the exhaust gas 113*f* in the exhaust pathways 108. Thus, the exhaust gas 113*f* in the exhaust pathways 108 simultaneously loses heat via heat transfer between the exhaust and inlet pathways 108 and 104 and gains heat via the exothermic reaction of oxidation.

The porous section 103 of the reactor may be designed such that most of the methane-air mixture 113*d* seeps through the pores 105 and only about 5% of the unoxidized methane-air mixture reached the activation zone 106 at the far end of the reactor 100. This design could be accomplished by computerized fluid dynamics calculations that simulate the gas flow rates, temperatures, heat available, and oxidation rates at several points along the pathways, thereby determine the pore size and spacing for each point. The sizes and spacing of each pore hole may be different, as determined by calculation. As disclosed hereinbefore, the activation zone 106 of the reactor 100 contains a heating element 107, which may use electricity, gas, or other means to maintain a temperature that could be in the range of 900° C. to 950° C. This high temperature, together with the low flow rate in the zone and therefore the long residence time in zone 106, will oxidize any methane surrounding the heating element 107. Thus, as the remaining small volume of methane-air mixture 113*e* travels into the activation zone 106, the mixture 113*e* will be heated and oxidized before the mixture 113*e* enters the exhaust pathways 108. Thus, in the manner disclosed hereinabove, all the methane which enters the reactor 100 is oxidized. During testing, when the mixture was fully oxidized, the heating element 107 was shut off to observe the effect on the oxidation. In some instances, the reactor was able to recover and continued to oxidize all the methane. Thus, the heating element may be useful for startup and may not be needed thereafter. It may not be needed at all if the porous and non-porous heat exchangers can be sufficiently preheated.

Next, the oxidized gas (exhaust gas) 113*f* travels from the far end towards the near end through the exhaust pathways 108. As the exhaust gas 113*f* travels through the porous section 103, the gas 113*f* encounters and heats the atomized methane-air mixture seeping through the pores. Again, it should be understood that as the exhaust gas 113*f* encounters the seeped methane-air mixture, the exhaust gas loses heat due to heat transfer but also gains heat due to the exothermic oxidation reaction.

Then, the fully oxidized exhaust gas travels through the exhaust pathways 108 past the transition 118 and into the non-porous section 102. In the non-porous section 102 the exhaust gas 113*g* loses heat via heat transfer to the methane-air mixture 113*c* in the inlet pathways 104. Next, the exhaust gas 113*h* exits the exhaust pathways 108 and enters the outlet passage 109. Finally, the exhaust gas 113*i* travels out of the reactor through the outlet valve 112, wherein the exiting hot exhaust gas can be utilized, for example, to generate mechanical or electrical power, or for heating purposes.

One of the main advantages to designing a reactor 100 with a non-porous heat exchanger section 102 and a porous heat exchanger section 103 is very high effectiveness in heat transfer, especially when compared to RTOs that must preheat large beds of ceramic shells. The membrane walls may be very thin, 0.3 mm or less, allowing high heat transfer, and also reducing the use of expensive high temperature alloys. It may also be possible to make composite heat exchangers that further reduce the use of high temperature alloys.

The use of both porous and non-porous heat exchangers working together allows the oxidation of much weaker streams of methane in air. As mentioned earlier, if a mixture of 0.2% methane in air is oxidized, the temperature of the gas increases by about 50° C. This temperature increase can be used with very thin heat transfer membranes to transfer heat from the oxidized gas to the incoming mixture. By using counter-flow heat transfer, fully oxidized gas at 800° C. can be used to heat the incoming mixture all the way from 20° C. to 750° C. The mixture is then oxidized, raising its temperature to 800° C. RTO systems commonly do not oxidize concentrations as low as 0.2% methane without using supplemental gas. A system that can oxidize streams with only 0.2% methane will be able to oxidize streams that could not be oxidized with other available technologies. This will allow oxidation of many streams of methane currently seeping into the atmosphere that cannot be oxidized today, making a big reduction in greenhouse gas emissions.

It should be noted that the heating element 107 can be used to activate the oxidation reaction when the reactor 100 is first turned on. Once the oxidation reaction starts, the method disclosed hereinabove is used to sustain and speed up the oxidation reaction, and the heating element 107 may also be shut off because the reaction sustains itself.

It should also be noted that several actions are typically taking place simultaneously. Such actions may be but are not limited to the actions disclosed hereinafter. The exhaust gas in the exhaust pathways 108 cools due to heat transfer as it gives up heat to the methane-air mixture in the inlet pathways 104. The methane-air mixture in the inlet pathways 104 is heated due to transfer as it gains heat from the exhaust gas in the exhaust pathways 108. The heat released by the oxidation reaction in the porous section 103 of the reactor raises the temperature of the exhaust gas. The heating element 107 increases the temperature of the methane-air mixture which reaches the activation zone, causing the methane to oxidize. The oxidized gas (exhaust gas) leaving the activation zone and traveling through the exhaust pathways 108 towards the near end encounter small particles and quantities of the cooler methane-air mixture, heating it and causing the mixture to react.

The number, pattern, distribution and/or size of pores 105 in the walls 117 in the porous section 103 may be chosen to allow the desired quantity of methane-air mixture to seep through each pore. It is intended that the seepage through each pore be small compared to the total flow. By limiting the flow through a single pore, the particles of the methane-air mixture traveling through that pore are small. As an example, testing was successful with a total of 324 pores evenly spaced, each with a pore hole size of 0.08 inches in diameter, for a total flow of about 25 standard cubic feet a minute methane/air mixture. It is anticipated that with computerized analysis of the data, future systems could have significantly different hole sizes, patterns and spacings. It is important that the mixture flowing through every pore be in small particle sizes and a small fraction of the total fluid flow because it is necessary for small quantities with small particle sizes of the seeping mixture to mix with much larger quantities of exhaust gas, so that the seeping mixture rapidly heats up and reacts.

As disclosed hereinabove, the mixture flowing through the pores is intended to mix with hotter gas in the exhaust pathways 108, and to be rapidly heated through mixing and convection which will cause the seeped mixture to oxidize. The size, placement and quantity of pores will depend on the mixture, i.e., methane in air or other gases being oxidized because each gas or fuel or fuel mixture has its own characteristics for oxidation rates, and these characteristics are dependent on concentrations, temperatures, pressures and other factors. In general, the pores should be as small as possible, consistent with fuel and air properties, manufacturing, volume and flow requirements, such that when the seeping mixture comes into contact with the relatively far larger flow of the exhaust gas in the exhaust pathways 108, the seeped mixture will quickly heat up and react, releasing the heat of the exothermic reaction, thereby raising the temperature and linking up with the exhaust gas in the exhaust pathways 108.

It should be noted that the pressure of the methane-air mixture 113*d* drops as it flows from left and towards the activation zone. The resulting pressure differential must be taken into consideration when determining the size and placement of pores. The size of the reactor and each pathway is also based upon factors such as the mixture flow rates, the time needed for the reaction at the various temperatures, the number and size of pores, the material, thickness and shape of the membranes and the heat transfer requirements for the system.

Additionally, it should be noted that the reactor 100 system can manage variations in the concentration of methane in air by volume. If the concentration of methane in the incoming mixture decreases, then the oxidation reaction may be stabilized by reducing incoming flow rates, thus, providing more time for the oxidation reaction to occur. If the concentration of methane in the incoming mixture increases (e.g., the concentration goes above 3%), then the air inlet valve 111 may be opened to let in air 111, thus, diluting the methane-air mixture. If the methane concentration in the incoming mixture drops so low that the reaction cannot be sustained, the fan 101 may be shutoff and valves 110, 112 may be closed. This will close the reactor 100 and conserve heat, making the reactor 100 available and ready when the methane content is high enough to continue oxidation.

Figure 2:
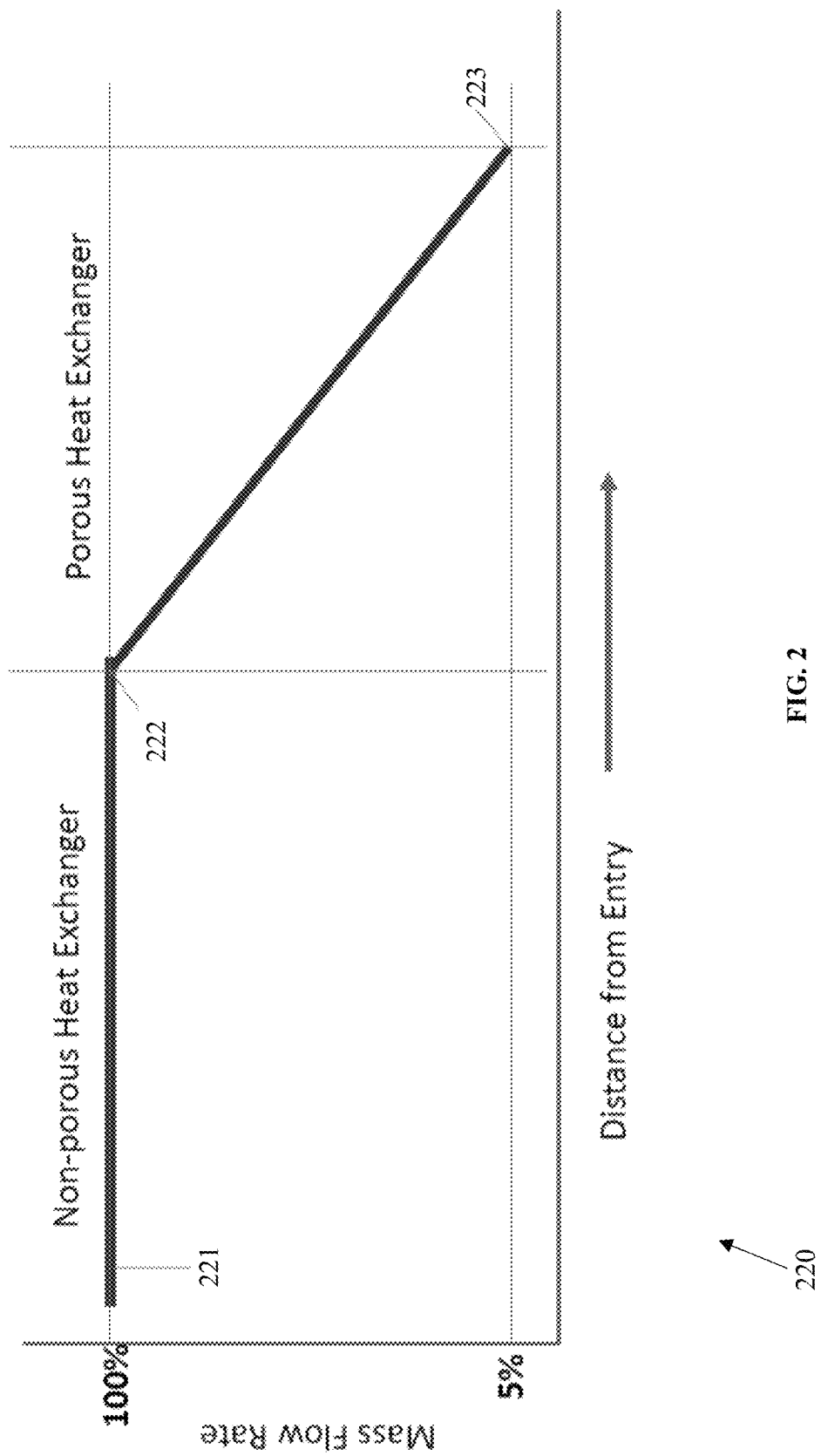
FIG. 2 shows a mass flow rate graph as the methane-air mixture travels from the near end to the far end of the reactor through the inlet pathways, according to an aspect.

FIG. 2 shows a mass flow rate graph 220 as the methane-air mixture travels from the near end to the far end of the reactor through the inlet pathways, according to an aspect. As shown, 100% of the methane-air mixture travels through the inlet pathways in the non-porous heat exchanger section of reactor 221. Due to the pores in the porous heat exchanger section of the reactor the quantity of unoxidized methane-air mixture traveling in the inlet pathways decreases from 100% at the transition 222 to about 5% of the flow at the activation zone. Thus, the heating element at the far end must only a small portion of the total methane-air mixture. Once the temperature in the porous heat exchanger section stabilizes, it may be possible to reduce the load on the heating element or to shut it off altogether.

Figure 3:
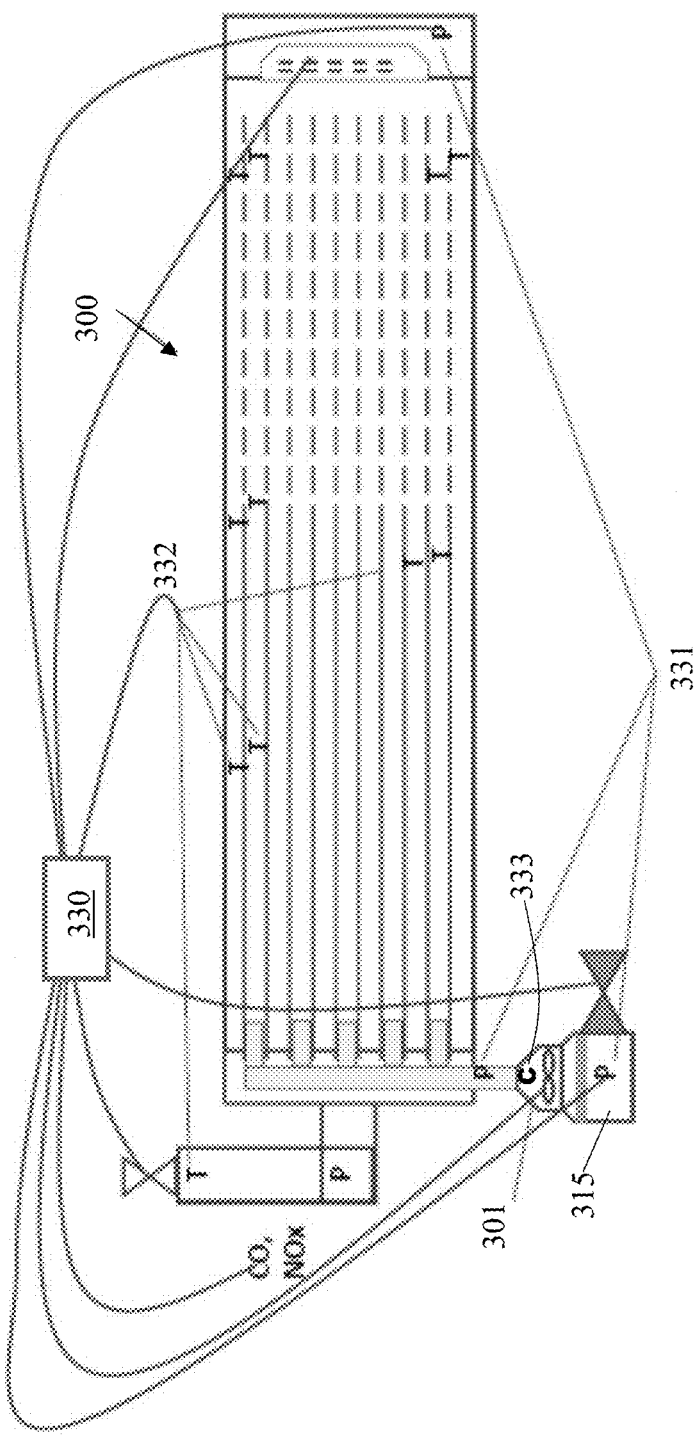
FIG. 3 illustrates exemplary placements for pressure, temperature, concentration sensors on a reactor, according to an aspect.

FIG. 3 illustrates exemplary placements for pressure, temperature, concentration sensors 331, 332, and 333, respectively, on a reactor 300, according to an aspect. Exemplary implementations for a reactor 300 are locations where methane seeps into the atmosphere, for example from both anthropogenic and natural sources, e.g., coal mines, landfills, and wetlands. These locations are unpredictable and variable, so may be advantageous to monitor and control the reactor 300 to ensure efficient and safe operation of the reactor 300. This may be accomplished by providing the reactor 300 with a system of sensors, which are monitored by a controller 330. Exemplary positions for a plurality of pressure sensors 331, temperature sensors 332, and a concentration sensor 333 are shown in FIG. 3. Pressure sensors 331 may be provided to monitor the flow rate of gases within the reactor 300. Should the pressure change without a corresponding change in flow, it may be an indication that the pores are starting to close and that maintenance is needed. Temperature sensors 332 may be provided to monitor the temperature which is an indicator of the rate of the oxidation reaction. A concentration sensor 333 may be provided to monitor the concentration of methane in air by volume of the incoming methane-air mixture. A controller 330 may be provided to monitor the readings from the sensors 331, 332, and 333. The controller may be configured to then use the sensor readings to control the reactor components, such as the fan 310, the inlet valve 315, and the heating element, as disclosed herein.

Figure 4:
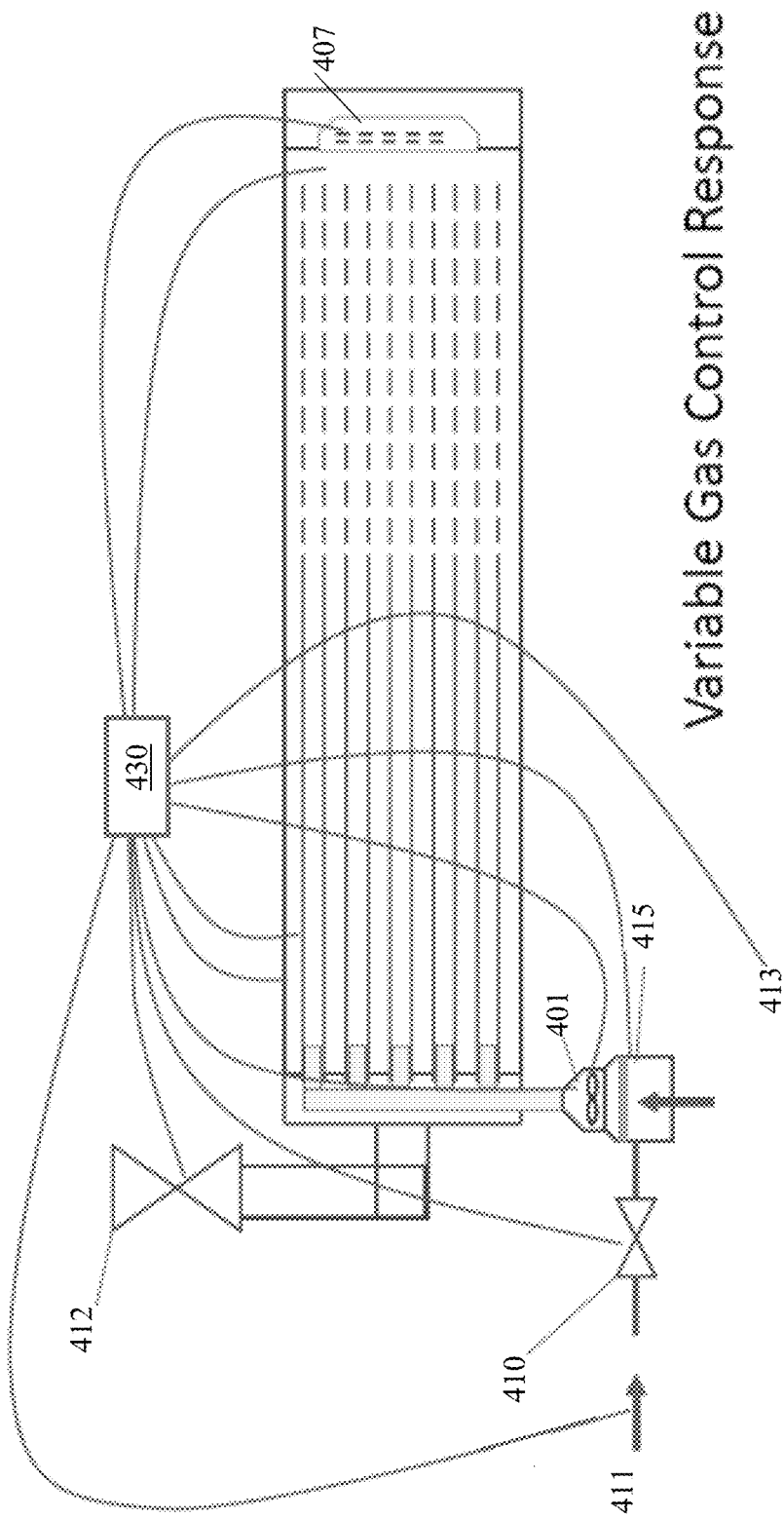
FIG. 4 illustrates a system of components a controller may manage when a reactor is operating in an unpredictable and variable environment, according to an aspect.

FIG. 4 illustrates a system of components a controller 430 may manage when a reactor 400 is operating in an unpredictable and variable environment, according to an aspect. Some of the components managed by the controller 430 may include, but are not limited to, the fan 401, the methane-air mixture inlet valve 415, the air inlet valve 410, the heating element 407, and the outlet valve 412, the diluting air supply through valve 402 the fan speed 403, the exhaust valve 404, all managed by controller 410.

In an example, the control system is formed by the controller 430, a mixture concentration sensor 333, temperature sensors 332, pressure sensors 331, heating element 407, fan 401, and valves 415, 410, and 412. The control system being programed to receive data from the concentration 333, temperature 432, and pressure 431 sensors and based thereon control the fan 401, heating elements, and valves 415, 410, and 412 as needed to maintain the desired concentrations of the methane in air and the optimal temperature and pressure of the gasses in the inlet and exhaust pathways. In an example, if the reaction temperature desired at the far end, i.e., activation zone, is 800 C, but the actual temperature achieved is only 790 C, the controller 430 may be programed to send a command to inlet valve 115 to reduce flow thus allowing more time for the methane-air mixture to travel through the inlet pathways and to receive more heat from the exhaust gas in the exhaust pathways.

In another example, if the temperature of the exhaust gas in the outlet passage is too high, the controller 430 may send a command to valve 115 or 110 to dilute the ratio of methane in air to reduce the temperature by for example increasing the amount of air 411 in the mixture. If the temperature of the exhaust gas is too low, the controller 430 may send a command to close the air inlet valve 410, thereby increasing the concentration of methane, which increases the heat released in the oxidation reaction. Thus, increasing the temperature of the exhaust gas in the outlet passage. The controller 107 may also command the heating element 407 to increase or decrease the heat provided in order to control the process.

Figure 5:
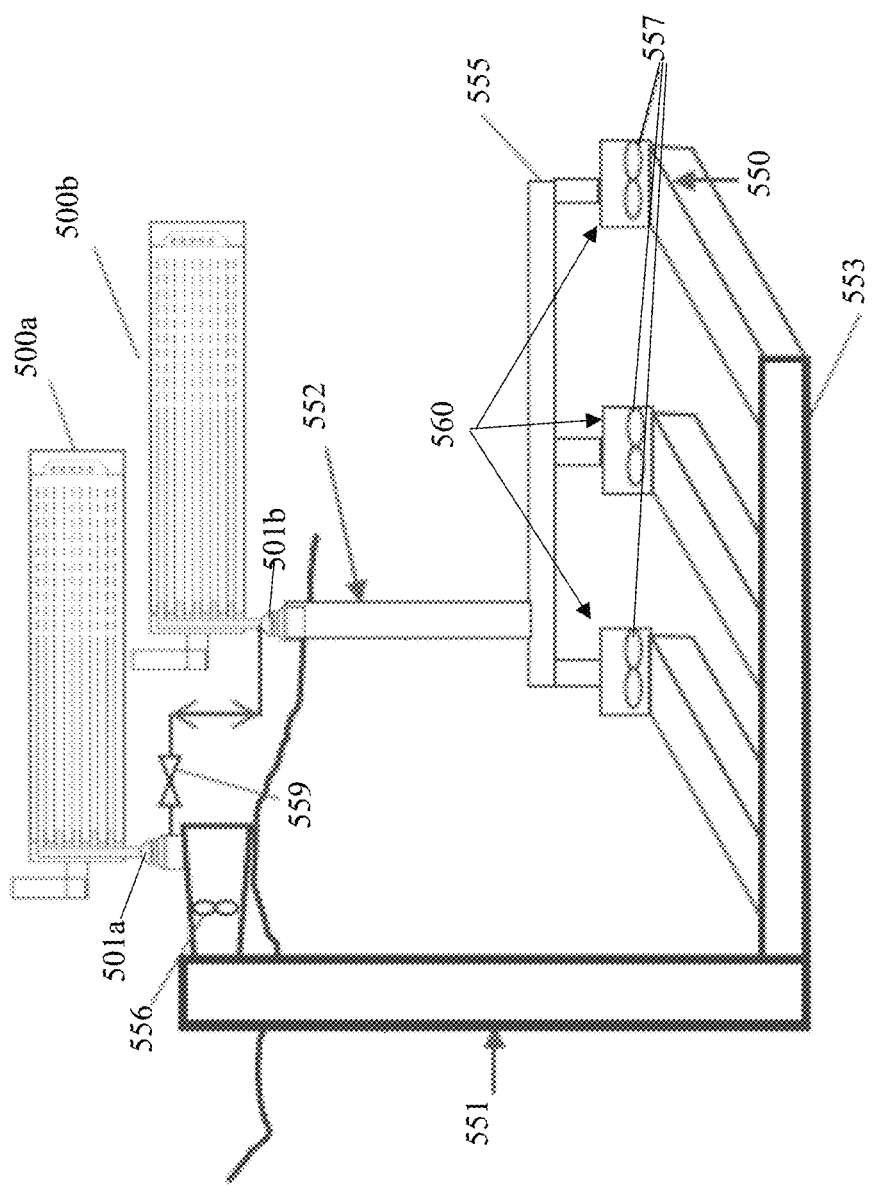
FIG. 5 illustrates two exemplary implementations of the disclosed reactor to oxidize excess methane from a coal mine, according to an aspect.

FIG. 5 illustrates two exemplary implementations of a reactor to oxidize excess methane from a coal mine, according to an aspect. During the coal mining process, methane leaks out of coal seams 550 and into the underground coal mines. Most mining operations prefer to dilute the methane in the mine shaft to well below 1% by volume using large fans to mix in air with the methane. Many mines also have "bleeder" shafts 552, which attempt to remove the methane before it merges with the main air supplied 551 to the mine. Methane concentration in such bleeder shafts 552 can sometimes reach 2%. The lower explosive limit of methane is at 5% concentration, so the maximum concentration of the VAM must be kept well below 2% to maintain safe operation.

As an example, VAM flows through mining tunnel 553, up the ventilation air shaft 551, and is drawn out by a mine exhaust fan 556. Then, the reactor 500a uses its own fan 501a to introduce a portion of the VAM into the reactor, where the introduced VAM is oxidized. Additionally, bleeder fans 557 draw the bleeder methane-air mixture away from the vicinity of the coal face 560 and push the methane-air mixture through a bleeder tunnel 555 and up the bleeder shaft 552. Then, the reactor 500b uses its own fan 501b to introduce a portion of the bleeder methane-air mixture into the reactor 500b, where the mixture is oxidized. Both reactors 500a and 500b may be configured to handle the concentrations of methane in air expected from their respective sources. Additionally, if the bleeder shaft 552 is close to the ventilation air shaft 551, an intertie 559 may be provided, wherein the intertie 559 links the inlet valves of the two reactors 500a and 500b. For example, if methane-air concentration in the reactor 500b from the bleeder shaft 552 needs dilution and the VAM in the ventilation air shaft 551 has a smaller concentration, then the reactor 500b could draw weaker methane concentration from the inlet of the reactor 500a, and vice versa.

Figure 6:
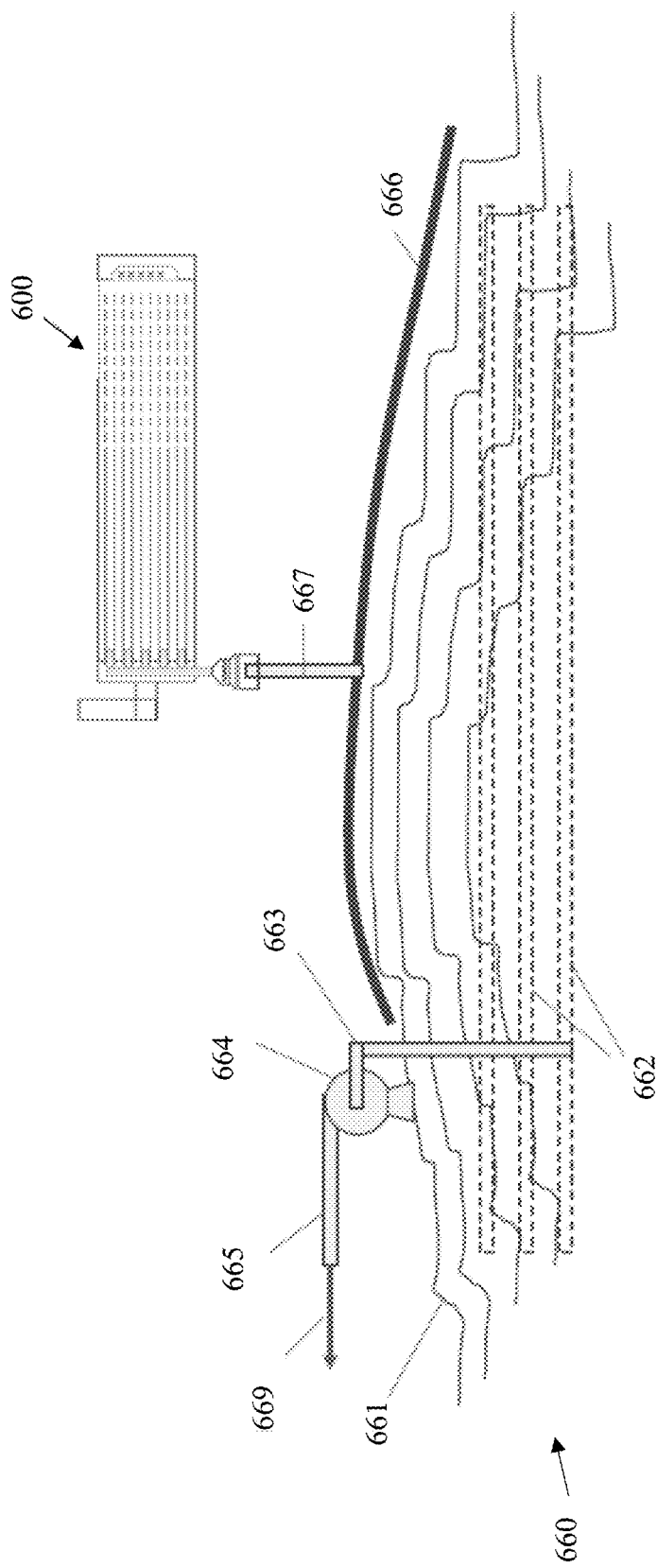
FIG. 6 illustrates an exemplary implementation of the disclosed reactor to oxidize methane escaping from a landfill, according to an aspect.

FIG. 6 illustrates an exemplary implementation of a reactor 600 to oxidize methane escaping from a landfill 660, according to an aspect. In landfills 660 methane is generated from the decaying organic matter 661 and landfills are often equipped with a method to collect and utilize the generated methane. As an example, a landfill may be provided collection pipes 662 which are positioned underneath the decaying matter 661 to collect the methane. Then a blower 664 may pull the methane up through a pipe 663, wherein the pipe 663 connected to the collection pipes 662. Next, the blower 664 sends the collected methane out 669 through pipe 665 for use. However, this collection method is not 100% efficient and not all the methane can be so collected. A portion of the methane may escape through the decaying matter 661 to the surface and then through the open environment into the atmosphere. Often the concentration of the escaping methane is weak.

In order to stop the methane from entering the atmosphere, a gas collection and delivery system can be utilized to collect the methane-air mixture. Then, the mixture can be introduced to a reactor 600 and oxidized. In this scenario, the gas collection system may comprise an impervious plastic layer 666, which is placed over the top of the landfill, and a pipe 667, which is configured to feed the methane-air mixture to the inlet valve of the reactor 600. Thus, the gas escaping into the open environment may be instead collected, fed into the reactor 600, and oxidized.

Figure 7:
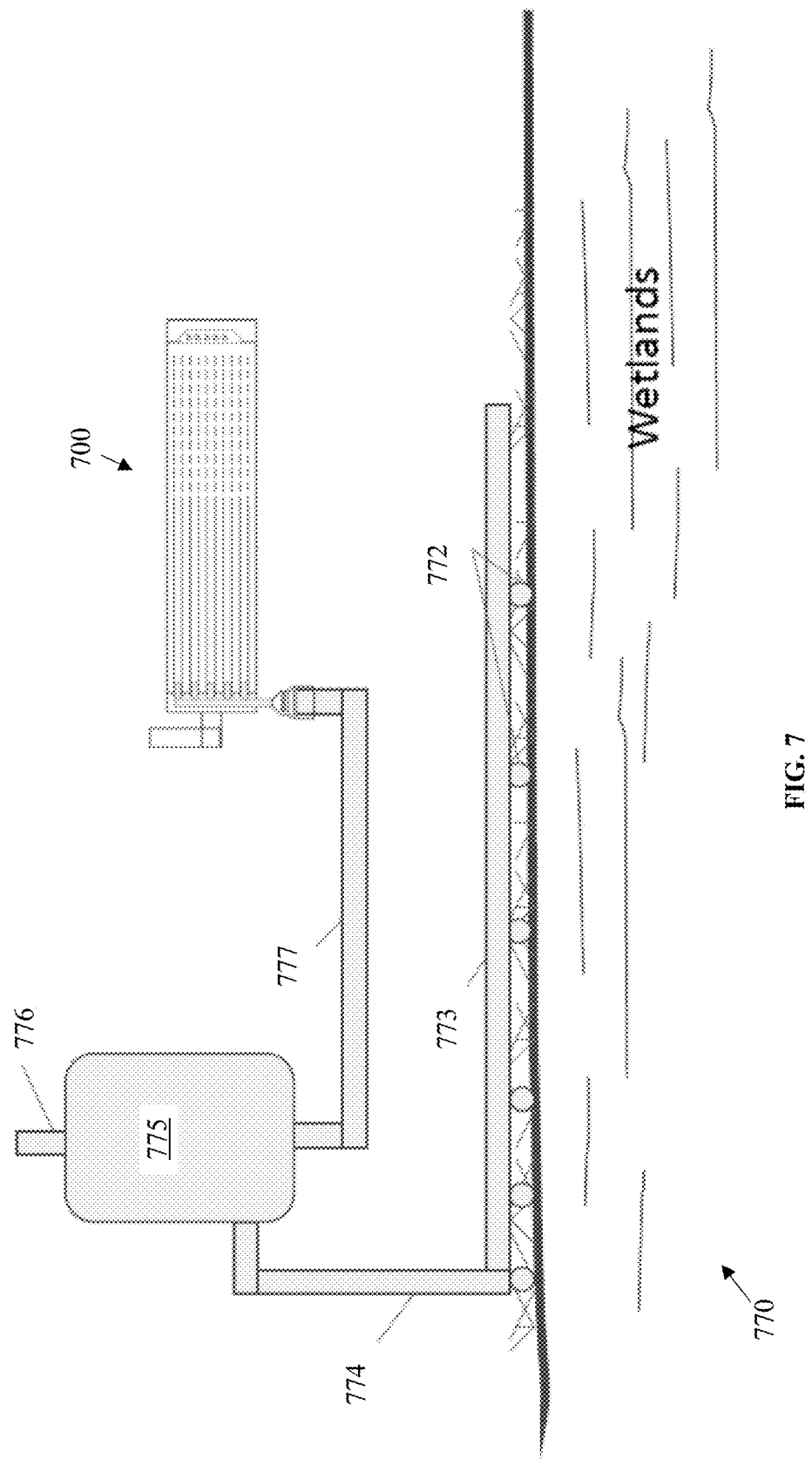
FIG. 7 illustrates another exemplary implementation of the disclosed reactor to oxidize methane escaping from wetlands, according to an aspect.

FIG. 7 illustrates another exemplary implementation of a reactor 700 to oxidize methane escaping from wetlands 770, according to an aspect. A wetland 770 is an open environment which releases weak concentrations of methane into the atmosphere as organic matter decays. In order to stop the methane from entering the atmosphere, a gas collection system can be utilized to collect the methane-air mixture. Then, the mixture can be introduced to a reactor 700 and oxidized. In this scenario, the gas collection and delivery system may comprise collectors 772, a concentrator 775, a vent 776, and passages 773, 774, and 777. First the collectors 772 collect the escaping methane-air mixture. Then, the mixture is pulled through passages 773 and 774 into the concentrator 775. If the concentration of methane is too weak for the reactor 700 to optimally operate, then the mixture can be concentrated in the concentrator 775 until the methane-air mixture raises to a sufficient concentration. Finally, the sufficiently high concentration of methane in air is delivered through passage 777 and to be introduced to the reactor 700 and oxidized. Thus, the gas escaping into the open environment may instead be collected, fed into the reactor 700, and oxidized. The concentrator may use adsorption, semi-permeable membranes, liquefaction or other means to separate the methane from the air and thus increases its concentration.

Figure 8:
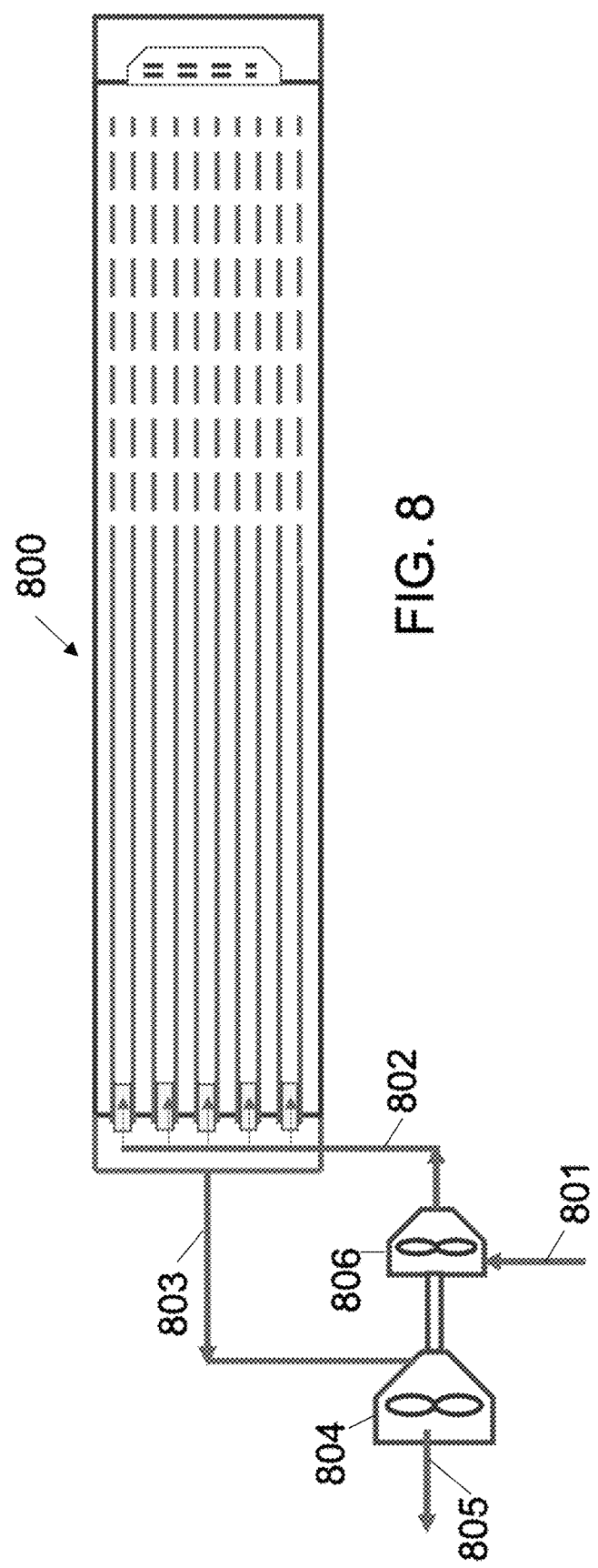
FIG. 8 illustrates a means to recover the energy exhausted by the reactor, according to an aspect.

FIG. 8 illustrates a means to recover the energy exhausted by the reactor, according to an aspect. After all needed heat has been transferred from the oxidized gas to the incoming gas mixture, there may still be some residual energy in the exiting gas. This energy can be recovered by running the gas through a gas turbine. The exhaust gas may be caused to travel through conduit 803 to a gas turbine 804 and then to exist through outlet 805. As it travels through the turbine, some of the energy in the gas is converted into mechanical energy, causing the turbine to rotate, which rotation is transferred to the fan 806. Fan 806 draws in the incoming methane-air mixture through 801, and delivers it through conduit 802 to the heat exchanger 800 for oxidation. The fan may pressurize the reactor, if desired. The higher pressure may make the reactor more compact, and also provide more pressure for the gas turbine to drive the fan.

It may be advantageous to set forth definitions of certain words and phrases used in this patent document. The term "couple" and its derivatives refer to any direct or indirect communication between two or more elements, whether or not those elements are in physical contact with one another. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Further, as used in this application, "plurality" means two or more. A "set" of items may include one or more of such items. Whether in the written description or the claims, the terms "comprising," "including," "carrying," "having," "containing," "involving," and the like are to be understood to be open-ended, i.e., to mean including but not limited to. Only the transitional phrases "consisting of" and "consisting essentially of," respectively, are closed or semi-closed transitional phrases with respect to claims.

If present, use of ordinal terms such as "first," "second," "third," etc., in the claims to modify a claim element does not by itself connote any priority, precedence or order of one claim element over another or the temporal order in which acts of a method are performed. These terms are used merely as labels to distinguish one claim element having a certain name from another element having a same name (but for use of the ordinal term) to distinguish the claim elements. As used in this application, "and/or" means that the listed items are alternatives, but the alternatives also include any combination of the listed items.

Throughout this description, the aspects, embodiments or examples shown should be considered as exemplars, rather than limitations on the apparatus or procedures disclosed or claimed. Although some of the examples may involve specific combinations of method acts or system elements, it should be understood that those acts and those elements may be combined in other ways to accomplish the same objectives.

Acts, elements and features discussed only in connection with one aspect, embodiment or example are not intended to be excluded from a similar role(s) in other aspects, embodiments or examples.

Aspects, embodiments or examples of the invention may be described as processes, which are usually depicted using a flowchart, a flow diagram, a structure diagram, or a block diagram. Although a flowchart may depict the operations as a sequential process, many of the operations can be performed in parallel or concurrently. In addition, the order of the operations may be re-arranged. With regard to flowcharts, it should be understood that additional and fewer steps may be taken, and the steps as shown may be combined or further refined to achieve the described methods.

If means-plus-function limitations are recited in the claims, the means are not intended to be limited to the means disclosed in this application for performing the recited function but are intended to cover in scope any equivalent means, known now or later developed, for performing the recited function.

Claim limitations should be construed as means-plus-function limitations only if the claim recites the term "means" in association with a recited function.

If any presented, the claims directed to a method and/or process should not be limited to the performance of their steps in the order written, and one skilled in the art can readily appreciate that the sequences may be varied and still remain within the spirit and scope of the present invention.

Although aspects, embodiments and/or examples have been illustrated and described herein, someone of ordinary skills in the art will easily detect alternate of the same and/or equivalent variations, which may be capable of achieving the same results, and which may be substituted for the aspects, embodiments and/or examples illustrated and described herein, without departing from the scope of the invention. Therefore, the scope of this application is intended to cover such alternate aspects, embodiments and/or examples. Hence, the scope of the invention is defined by the accompanying claims and their equivalents. Further, each and every claim is incorporated as further disclosure into the specification.

It should also be noted that, while the disclosure above uses methane as the oxidizable fuel, the system disclosed herein may be also used with hydrogen, natural gas, ammonia, or a blend of oxidizable gases, such as volatile organic compounds (VOCs).

What is claimed is:

1. An apparatus for oxidizing an oxidizable fluid mixture, the apparatus comprising a reactor combining the properties of non-porous heat transfer and porous heat transfer, the reactor comprising:
   a) a heat exchanger having a non-porous section, a porous section, each section having hot pathways and cold pathways adjacent to each other, both hot and cold pathways extending throughout the non-porous and porous sections, the hot and cold pathways being separated in the non-porous section by membranes that transfer heat but do not allow flow through the membranes, the hot and cold pathways being separated in the porous section by porous membranes that can transfer heat and also allow flow through the membranes from the cold pathways to the hot pathways, wherein the oxidizable fluid mixture forms on a cold side of the heat exchanger and wherein the oxidizable fluid mixture is oxidized on a hot side of the heat exchanger;
   b) an inlet wherein the oxidizable fluid mixture can enter, the inlet being in fluid communication with a near end of the cold side of the heat exchanger;
   c) wherein the cold pathways of the non-porous section of the heat exchanger are in fluid communication with the cold pathways of the porous section of the heat exchanger, allowing the oxidizable fluid mixture to flow from the non-porous section into the porous section of the heat exchanger;
   d) wherein the hot pathways of the non-porous section of the heat exchanger are in fluid communication with the hot pathways of the porous section of the heat exchanger, allowing a hot fluid resulting from the oxidation of the fluid mixture to flow, in a direction opposite the flow of the incoming oxidizable fluid mixture, from the porous section into the non-porous section of the heat exchanger and then out of the reactor;
   e) wherein, when the reactor is in use, portions of the oxidizable fluid mixture entering the porous section of the heat exchanger flow from the cold pathways through pores of the porous membranes into the hot pathways of the porous section and remaining portions of the oxidizable fluid mixture flow out of the cold side of the porous section via a far end of the cold pathways;
   f) wherein, when the reactor is in use, the hot fluid flows through the hot pathways of the porous section of the heat exchanger, mixing with, heating up and oxidizing the portions of oxidizable fluid mixture entering the hot side from the cold section through the pores of the porous membranes; and
   g) wherein, when the reactor is in use, the hot fluid from the hot pathways of the porous section loses heat through heat transfer, through the membranes, to the incoming oxidizable fluid mixture and gains heat released by the oxidation of the entering oxidizable fluid mixture.

2. The apparatus of claim 1 further comprising an activation zone in fluid communication with the far end of the cold pathways and a near end of the hot pathways of the porous section of the heat exchanger.

3. The apparatus of claim 2, wherein the activation zone comprises a heating element that can raise the temperature of the oxidizable fluid mixture above the oxidation temperature, causing the oxidizable fluid mixture to oxidize.

4. The apparatus of claim 1, wherein some or all membranes are metallic, non-metallic, or composite, or a combination of metallic, non-metallic and composite.

5. The apparatus of claim 1, wherein no catalyst is used to facilitate the oxidation reaction.

6. The apparatus of claim 1, further comprising a gas collection and delivery system configured to collect the oxidizable fluid mixture and deliver the oxidizable fluid mixture to the reactor.

7. The apparatus of claim 1, wherein the hot fluid flowing out of the reactor is caused to drive a gas turbine, that in turn drives a fan that propels the oxidizable fluid mixture into the cold side of the non-porous section of the heat exchanger.

8. The apparatus of claim 1, wherein the energy in the hot fluid flowing out of the reactor is used for heating.

9. The apparatus of claim 1, wherein no ceramic is used to anchor the oxidation reaction.

10. An apparatus for oxidizing a mixture of methane and air, the apparatus comprising a reactor combining the properties of non-porous heat transfer and porous heat transfer, the reactor comprising:
   a. an inlet disposed at a near end of the reactor, the inlet being configured to allow entering of an unoxidized mixture of methane and air, wherein the mixture of methane and air is below a rapid oxidation temperature of methane and the concentration of methane in air is below the lower explosive limit of methane in air;
   b. a plurality of inlet pathways extending from the near end of reactor to a far end of the reactor, wherein the mixture of methane and air is below the rapid oxidation temperature;
   c. wherein, the mixture of methane and air flows within the inlet pathways from the near end of the reactor towards the far end of the reactor;
   d. a heating element disposed at the far end of the reactor, wherein the heating element is maintained above the rapid oxidation temperature;
   e. a plurality of exhaust pathways extending from the far end of the reactor to the near end of the reactor, wherein the oxidized mixture of methane and air is at or above a rapid oxidation temperature;
   f. wherein, the oxidized mixture of methane and air flows within the exhaust pathways from the far end of the reactor towards the near end of the reactor;
   g. an outlet disposed at the near end of the reactor, the outlet being adapted to allow exit from the reactor of fully oxidized mixture of methane and air from the exhaust pathways;
   h. wherein, the inlet pathways and exhaust pathways are adjacent;
   i. wherein, the inlet pathways and exhaust pathways are separated by walls;
   j. a non-porous heat exchanger section disposed from the near end of the reactor to a transition, wherein the walls which separate the inlet and exhaust pathways within the non-porous heat exchanger section allow for heat transfer to occur between the inlet and exhaust pathways;
   k. wherein the transition is disposed at a location where the mixture of methane and air within the inlet pathways is at about 600 degrees Celsius to about 750 degrees Celsius;
   l. a porous heat exchanger section disposed from the transition to the far end of the reactor; wherein the walls which separate the inlet and exhaust pathways within the porous heat exchanger section have a plurality of pores, wherein the pores allow the unoxidized mixture of methane and air to seep from the inlet pathways into the exhaust pathways, such that the unoxidized mixture of methane and air is broken into particles;
   m. wherein the seeped mixture of methane and air is rapidly heated by the oxidized mixture of methane and air from the exhaust pathways, thus oxidizing the seeped mixture of methane and air;
   n. wherein, the oxidized mixture of methane and air within the exhaust pathways loses heat due to heat transfer and the unoxidized mixture of methane and air and gains heat due to heat transfer;
   o. wherein, the oxidized mixture of methane and air gains heat through the oxidation of the seeped mixture of methane and air;
   p. wherein about 95% of the mixture of methane and air is seeped from the inlet pathways into the exhaust pathways and oxidized; and
   q. wherein about 5% of the mixture of methane and air traveling from the inlet pathways nears the heating element, is heated and thus oxidized by the heating element, and travels into the exhaust pathways at the far end of the reactor.

11. The apparatus for oxidizing a mixture of methane and air of claim 10, wherein no catalyst is used to facilitate the oxidation reaction.

12. The apparatus for oxidizing a mixture of methane and air of claim 10, further comprising a gas collection and delivery system configured to collect the methane and deliver the methane to the reactor.

13. An apparatus for oxidizing a mixture of methane and air, the apparatus comprising a reactor combining the properties of non-porous heat transfer and porous heat transfer, the reactor comprising:
   a. an inlet disposed at a near end of the reactor, the inlet being configured to allow entering of an unoxidized mixture of methane and air, wherein the mixture of methane and air is below a rapid oxidation temperature of methane and the concentration of methane in air is below the explosive limit of methane in air;
   b. a plurality of inlet pathways extending from the near end of reactor to a far end of the reactor, wherein the mixture of methane and air is below the rapid oxidation temperature;
   c. wherein, the mixture of methane and air flows within the inlet pathways from the near end of the reactor towards the far end of the reactor;
   d. a heating element disposed at the far end of the reactor, wherein the heating element is maintained above the rapid oxidation temperature;
   e. a plurality of exhaust pathways extending from the far end of the reactor to the near end of the reactor, wherein the oxidized mixture of methane and air is at or above the rapid oxidation temperature;
   f. wherein, the oxidized mixture of methane and air flows within the exhaust pathways from the far end of the reactor towards the near end of the reactor;
   g. an outlet disposed at the near end of the reactor, the outlet being adapted to allow exit from the reactor of fully oxidized mixture of methane and air from the exhaust pathways;
   h. wherein, the inlet pathways and exhaust pathways are separated by walls;
   i. a non-porous heat exchanger section disposed from the near end of the reactor to a transition, wherein the walls which separate the inlet and exhaust pathways within the non-porous heat exchanger section are solid and allow for heat transfer to occur between the inlet and exhaust pathways;
   j. wherein the transition is disposed at a location where the mixture of methane and air within the inlet pathways is about 600 degrees Celsius to about 750 degrees Celsius;
   k. a porous heat exchanger section disposed from the transition to the far end of the reactor; wherein the walls which separate the inlet and exhaust pathways within the porous heat exchanger section have a plurality of pores, wherein the pores allow the unoxidized mixture of methane and air to seep from the inlet pathways into the exhaust pathways, such that the unoxidized mixture of methane and air is broken into particles;
l. wherein the seeped the mixture of methane and air is rapidly heated by the oxidized mixture of methane and air from the exhaust pathways, thus oxidizing the seeped mixture of methane and air;
m. wherein, the oxidized mixture of methane and air within the exhaust pathways loses heat due to heat transfer and the unoxidized mixture of methane and air and gains heat due to heat transfer; and
n. wherein, the oxidized mixture of methane and air gains heat through the oxidation of the seeped mixture of methane and air.

14. The apparatus for oxidizing a mixture of methane and air of claim 13, wherein about 95% of the mixture of methane and air is seeped from the inlet pathways into the exhaust pathways and is oxidized.

15. The apparatus for oxidizing a mixture of methane and air of claim 13, wherein about 5% of the mixture of methane and air traveling from the inlet pathways nears the heating element, is heated by the heating element and thus oxidized, and travels into the exhaust pathways at the far end of the reactor.

16. The apparatus for oxidizing a mixture of methane and air of claim 13, wherein some or all membranes are metallic, non-metallic, or composite, or a combination of metallic, non-metallic and composite.

\* \* \* \* \*